United States Patent
Lucas et al.

(10) Patent No.: US 7,954,021 B2
(45) Date of Patent: May 31, 2011

(54) SOLID STATE DRIVE WITH FLASH SPARING

(75) Inventors: Gregg S. Lucas, Tucson, AZ (US); Gary A. Tressler, Poughkeepsie, NY (US); Dustin J. Vanstee, Poughkeepsie, NY (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/604,614

(22) Filed: Oct. 23, 2009

(65) Prior Publication Data
US 2011/0099419 A1    Apr. 28, 2011

(51) Int. Cl.
G11C 29/00    (2006.01)
(52) U.S. Cl. .................................. 714/723; 714/710
(58) Field of Classification Search .................. 711/165, 711/218; 713/310, 324; 714/6, 7, 47, 773, 714/770, 723, 710
See application file for complete search history.

(56) References Cited

U.S. PATENT DOCUMENTS

| | | | |
|---|---|---|---|
| 5,321,697 A * | 6/1994 | Fromm et al. | 714/7 |
| 5,835,694 A * | 11/1998 | Hodges | 714/6 |
| 5,889,795 A | 3/1999 | Niijima et al. | |
| 6,295,591 B1 * | 9/2001 | Bealkowski et al. | 711/165 |
| 6,507,890 B1 | 1/2003 | Morley et al. | |
| 6,567,889 B1 | 5/2003 | DeKoning et al. | |
| 7,136,966 B2 | 11/2006 | Hetrick | |
| 7,149,846 B2 | 12/2006 | Hetrick | |
| 7,506,187 B2 * | 3/2009 | Maddock | 713/310 |
| 7,694,188 B2 * | 4/2010 | Raghuraman et al. | 714/47 |
| 2003/0056141 A1 | 3/2003 | Lai et al. | |
| 2008/0126682 A1 | 5/2008 | Zhao et al. | |
| 2008/0307192 A1 * | 12/2008 | Sinclair et al. | 711/218 |
| 2009/0287956 A1 * | 11/2009 | Flynn et al. | 714/6 |
| 2010/0061207 A1 * | 3/2010 | Trantham | 369/53.1 |
| 2010/0162020 A1 * | 6/2010 | Maule et al. | 713/324 |

FOREIGN PATENT DOCUMENTS

WO    2007137013 A2    11/2007

OTHER PUBLICATIONS

Anonymous. Method for fault tolerance in novolatile storage, IPCOMM, Feb. 3, 2005, IPCOMM000042268D, IPCOMM Prior Art Database.

* cited by examiner

*Primary Examiner* — David Ton
(74) *Attorney, Agent, or Firm* — Cantor Colburn LLP; William Kinnaman

(57) ABSTRACT

A method for flash sparing on a solid state drive (SSD) includes detecting a failure from a primary memory device; determining if a failure threshold for the primary memory device has been reached; and, in the event the failure threshold for the primary memory device has been reached: quiescing the SSD; and updating an entry in a sparing map table to replace the primary memory device with a spare memory device.

17 Claims, 3 Drawing Sheets

SOLID STATE DRIVE WITH FLASH SPARING

BACKGROUND

This disclosure relates generally to the field of solid state drives (SSDs).

SSDs are increasingly being used in computing systems instead of hard disk drives (HDDs), due to improved performance and decreased mechanical reliability issues. However, an issue for SSDs is the reliability of the device interface. An SSD comprises a chip controller that is connected via a high speed interface to the computing system. Storage elements are connected to the controller chip via a device interface. The controller chip translates the high speed interface protocol into the protocol required by the storage elements. The storage elements may comprise flash devices, and the device interface may comprise a flash interface and flash busses. Over time, flash devices or busses may stop working due to overuse or prolonged exposure to high voltages. Contacts connecting the controller chip to the flash devices may also corrode and wear out over time. If such problems occur, the SSD may not be able to store and fetch data as needed.

SUMMARY

An exemplary embodiment of a method for flash sparing on a solid state drive (SSD) includes detecting a failure from a primary memory device; determining if a failure threshold for the primary memory device has been reached; and, in the event the failure threshold for the primary memory device has been reached: quiescing the SSD; and updating an entry in a sparing map table to replace the primary memory device with a spare memory device.

An exemplary embodiment of a system for flash sparing on a solid state drive (SSD) includes a primary memory device; a spare memory device; and a sparing module, the sparing module configured to: detect a failure from the primary memory device; determine if a failure threshold for the primary memory device has been reached; and, in the event the failure threshold for the primary memory device has been reached: quiesce the SSD; and update an entry in a sparing map table to replace the primary memory device with the spare memory device.

An exemplary embodiment of a computer program product comprising a computer readable storage medium containing computer code that, when executed by a computer, implements a method for flash sparing on a solid state drive (SSD), wherein the method includes detecting a failure from a primary memory device; determining if a failure threshold for the primary memory device has been reached; and, in the event the failure threshold for the primary memory device has been reached: quiescing the SSD; and updating an entry in a mapping table to replace the primary memory device with a spare memory device.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for SSD flash sparing are provided, with exemplary embodiments being discussed below in detail.

An SSD having flash sparing capability comprises one or more spare memory devices that may be used in case of memory device wearout or bus failure problems. A spare memory device may comprise one or more stacked flash storage elements. When a memory device failure is detected, sparing is performed by scrubbing the failed memory device and writing back corrected data from the failed memory device into a spare device using error checking and correction (ECC) readback from the remaining flash devices.

Figure 1:
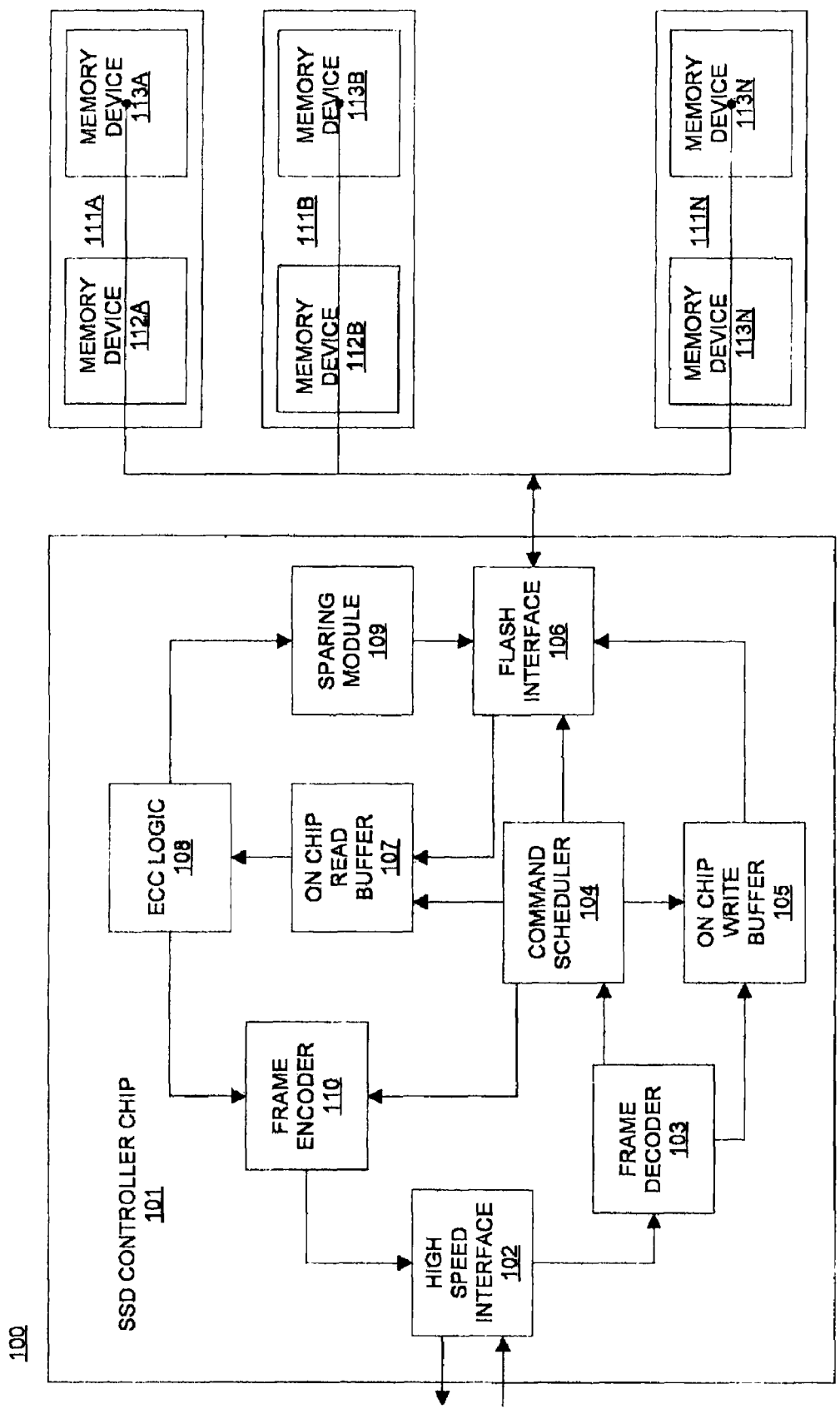
FIG. 1 illustrates an embodiment of an SSD with flash sparing.

FIG. 1 illustrates an embodiment of an SSD 100 with flash sparing. SSD 100 comprises SSD controller chip 101 and memory device sites 111A-111N. SSD controller chip 101 communicates with a computing system (not shown) via high speed interface 102, which may comprise Serial Advanced Technology Attachment (SATA), Fibre Channel (FC), Peripheral Component Interconnect Express (PCIe), Serial Attached Small Computer System Interface (SAS), or any other appropriate type of transmit and receive ports. Data to be written into the SSD memory is received on high speed interface 102, and is sent to on-chip write buffer 105 via frame decoder 103. From on-chip write buffer 105, the write data is written into the appropriate memory device via flash interface 106. For SSD read operations, data is read out of the appropriate memory device via flash interface 106, and the read out data is sent to on-chip read buffer 107, then to high speed interface 102 via error checking and correction (ECC) logic 108 and frame encoder 110. Command scheduler 104 receives commands from the computing system (not shown) via frame decoder 103, and controls on-chip write buffer 105, flash interface 106, on-chip read buffer 107, and frame encoder 110. Error checking and correction (ECC) logic 108 performs error correction functions and sends information regarding read failures, such as retry events, to the sparing module 109. Sparing module 109 performs flash sparing based on detected read failures.

Memory device sites 111A-111N comprise flash memory devices 112A and 113A, 112B and 113B, and 112N and 113N, respectively. Memory device sites 111A-111N are shown for illustrative purposes only; an SSD 100 may comprise any appropriate number of memory device sites, and the memory device sites may comprise any appropriate number of flash memory devices. Flash interface 106 comprises a plurality of flash ports in communication with N flash busses. Each of the N flash busses may connect to multiple flash devices through the use of independent chip selects and on chip addressing. The N flash busses may comprise 64 bit busses in some embodiments. When a write or read occurs, all N busses may be accessed. When a write occurs, N devices may be written with an ECC code from ECC logic 108 that corrects for an M bit symbol with the symbol size equal to a flash device bus width.

To determine if a sparing operation is necessary, a failure map table and sparing map table are maintained in sparing module 109. The failure map table tracks of the number of read failures per memory device. If a failure occurs, sparing module 109 increments a counter for the physical port of the memory device associated with the failure. After a predetermined threshold of failures is reached for a particular memory device, the sparing logic may replace the particular memory device with a spare memory device. Failure thresholds may be configurable on a user application basis. An embodiment of a failure map table is shown in Table 1:

TABLE 1

| Physical Port | Failure Count | Threshold |
| --- | --- | --- |
| Port 0, Site 0, Device 0 | 2 | 3 |
| Port 0, Site 0, Device 7 | 1 | 2 |
| Port 0, Site 15, Device 0 | 1 | 2 |
| Port 0, Site 15, Device 7 | 0 | 3 |

The sparing map table defines the logical to physical mapping for each device. An embodiment of a sparing map table is shown in Table 2:

TABLE 2

| Logical | | Physical |
| --- | --- | --- |
| Port 0, Site 0, Device 0 | => | Port 0, Site 0, Device 0 |
| Port 0, Site 0, Device 7 | => | Port 0, Site 0, Device 7 |
| Port 0, Site 15, Device 0 | => | Port 0, Site 15, Device 0 |
| Port 0, Site 15, Device 7 | => | Port 0, Site 17, Device 0 (spared) |

In the embodiment of Table 2, Port 0, Site 15, Device 7 has reached its threshold of read failures, and Port 0, Site 17, Device 0 has been mapped to function in its place. The SSD may function as normal, using the spare device (Port 0, Site 17, Device 0) in place of the failed device (Port 0, Site 15, Device 7).

Figure 2:
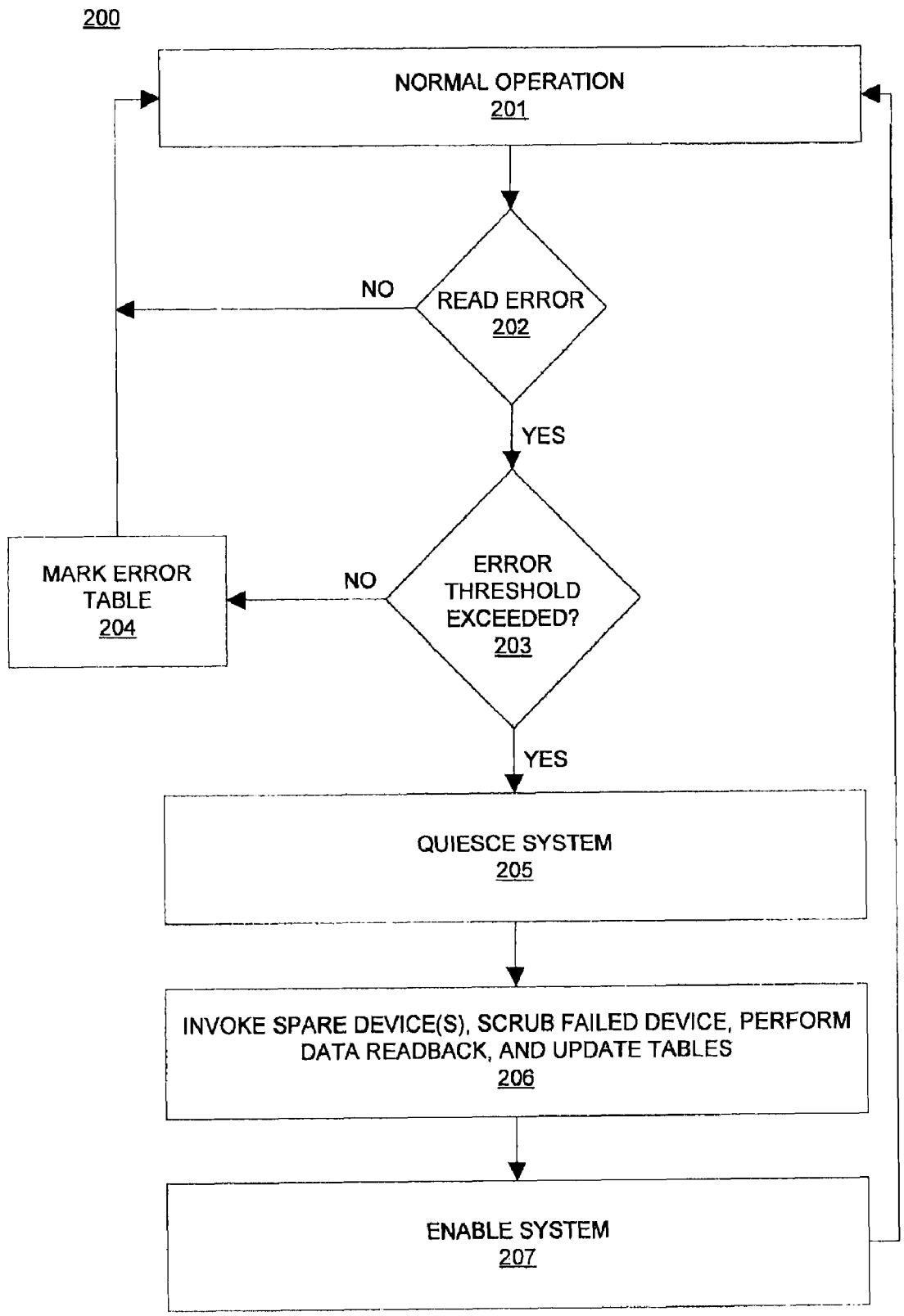
FIG. 2 illustrates an embodiment of a method for SSD flash sparing.

FIG. 2 illustrates an embodiment of a method 200 for SSD flash sparing. In block 201, the SSD operates as normal, performing reads and writes. In block 202, a read failure is detected. When the read failure is detected, sparing module 109 determines whether the failure threshold for the memory device that is the source of the read failure has been exceeded in block 203 based on the failure map table. If the threshold has not been exceeded, the sparing module 109 increments the failure count of physical port associated with the memory device that is the source of the failure in the failure map table in block 204. If the threshold has been exceeded, the sparing module 109 issues a command to quiesce SSD 100 in block 205. In block 206, a spare memory device is invoked to replace the failed memory device, the failed memory device is scrubbed, and corrected data is written back from the failed memory device into the spare memory device using ECC readback from the remaining flash devices. The sparing map table and failure map table in sparing module 109 are updated to reflect the sparing action. The failure count for the spare memory device in the failure map table is initialized to zero. In block 207, SSD 100 is re-enabled, and flow returns to normal operation in block 201, with the spare memory device functioning in place of the failed memory device.

Failure mechanisms that may be fixed by flash sparing include, but are not limited to, solder joint failures on the controller chip 101 and flash interface 106. If the entire flash interface 106 fails, the memory devices 111A-111N may be spared out in the order in which the device failures occur. If a single bus fails, each read from a storage device connected to the bus may cause a retry event. Once the number of retries reaches the failure threshold, the device may be spared. The devices on a bus may be spared in the order they are accessed for reads.

Figure 3:
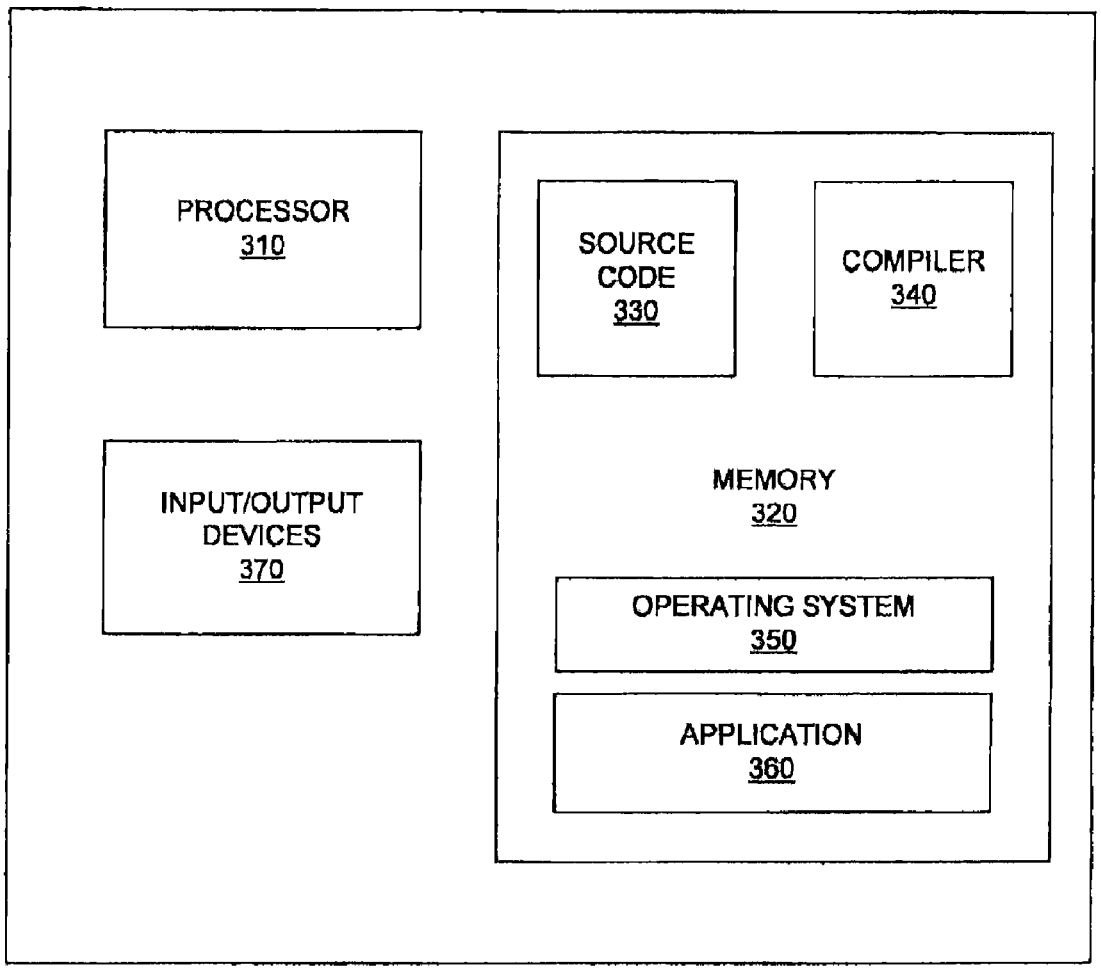
FIG. 3 illustrates a computer that may be used in conjunction with an SSD with flash sparing.

FIG. 3 illustrates an example of a computer 300 having capabilities, which may be utilized by exemplary embodiments of an SSD with flash sparing as embodied in software. Various operations discussed above may utilize the capabilities of the computer 300. One or more of the capabilities of the computer 300 may be incorporated into any element, module, application, and/or component discussed herein.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more input and/or output (I/O) devices 370 that are communicatively coupled via a local interface (not shown). The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a digital signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to, a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include mitigation of SSD memory element failure.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for flash sparing on a solid state drive (SSD), the method comprising:
   maintaining a failure map table, the failure map table comprising a plurality of failure counters, each of the failure counters indicating a number of failures for an associated memory device of a plurality of memory devices of the SSD;
   detecting a failure from a primary memory device;
   incrementing the failure counter associated with the primary memory device in the failure map table;
   determining whether the failure counter associated with the primary memory device has reached a failure threshold for the primary memory device; and,
   in the event the failure threshold for the primary memory device has been reached:
   quiescing the SSD;

updating an entry in a sparing map table to replace the primary memory device with a spare memory device; and initializing a failure counter associated with the spare memory device in the failure map table to zero.

2. The method of claim 1, wherein the failure comprises a read failure.

3. The method of claim 1, further comprising scrubbing the primary memory device.

4. The method of claim 1, further comprising writing back data from the primary memory device into the spare memory device via error checking and correction (ECC) readback from one or more other memory devices.

5. The method of claim 1, wherein the primary memory device is a flash memory device, and the spare device is a flash memory device.

6. The method of claim 1, wherein the failure threshold is configurable by a user.

7. A system for flash sparing on a solid state drive (SSD), comprising:
 a primary memory device;
 a spare memory device; and
 a sparing module, the sparing module configured to:
  maintain a failure map table, the failure map table comprising a plurality of failure counters, each of the failure counters indicating a number of failures for an associated memory device of a plurality of memory devices of the SSD;
  detect a failure from a primary memory device;
  increment the failure counter associated with the primary memory device in the failure map table;
  determine whether the failure counter associated with the primary memory device has reached a failure threshold for the primary memory device; and,
  in the event the failure threshold for the primary memory device has been reached:
   quiesce the SSD;
   update an entry in a sparing map table to replace the primary memory device with a spare memory device; and
   initialize a failure counter associated with the spare memory device in the failure map table to zero.

8. The system of claim 7, further comprising scrubbing the primary memory device.

9. The system of claim 7, further comprising an error checking and correction (ECC) module configured to write back data from the primary memory device into the spare memory device via ECC readback from one or more other memory devices.

10. The system of claim 7, wherein the primary memory device is a flash memory device, and the spare device is a flash memory device.

11. The system of claim 7, wherein the failure threshold is configurable by a user.

12. A computer program product comprising a computer readable storage medium containing computer code that, when executed by a computer, implements a method for flash sparing on a solid state drive (SSD), wherein the method comprises:
 maintaining a failure map table, the failure map table comprising a plurality of failure counters, each of the failure counters indicating a number of failures for an associated memory device of a plurality of memory devices of the SSD;
 detecting a failure from a primary memory device;
 incrementing the failure counter associated with the primary memory device in the failure map table;
 determining whether the failure counter associated with the primary memory device has reached a failure threshold for the primary memory device; and,
 in the event the failure threshold for the primary memory device has been reached:
  quiescing the SSD;
  updating an entry in a sparing map table to replace the primary memory device with a spare memory device; and
  initializing a failure counter associated with the spare memory device in the failure map table to zero.

13. The computer program product according to claim 12, wherein the failure comprises a read failure.

14. The computer program product according to claim 12, wherein the method further comprises scrubbing the primary memory device.

15. The computer program product according to claim 12, wherein the method further comprises writing back data from the primary memory device into the spare memory device via error checking and correction (ECC) readback from one or more other flash devices.

16. The computer program product according to claim 12, wherein the primary memory device is a flash memory device, and the spare device is a flash memory device.

17. The computer program product according to claim 12, wherein the failure threshold is configurable by a user.

* * * * *